(No Model.)
R. M. HUNTER.
FRUIT PRESS.
No. 370,015. Patented Sept. 13, 1887.
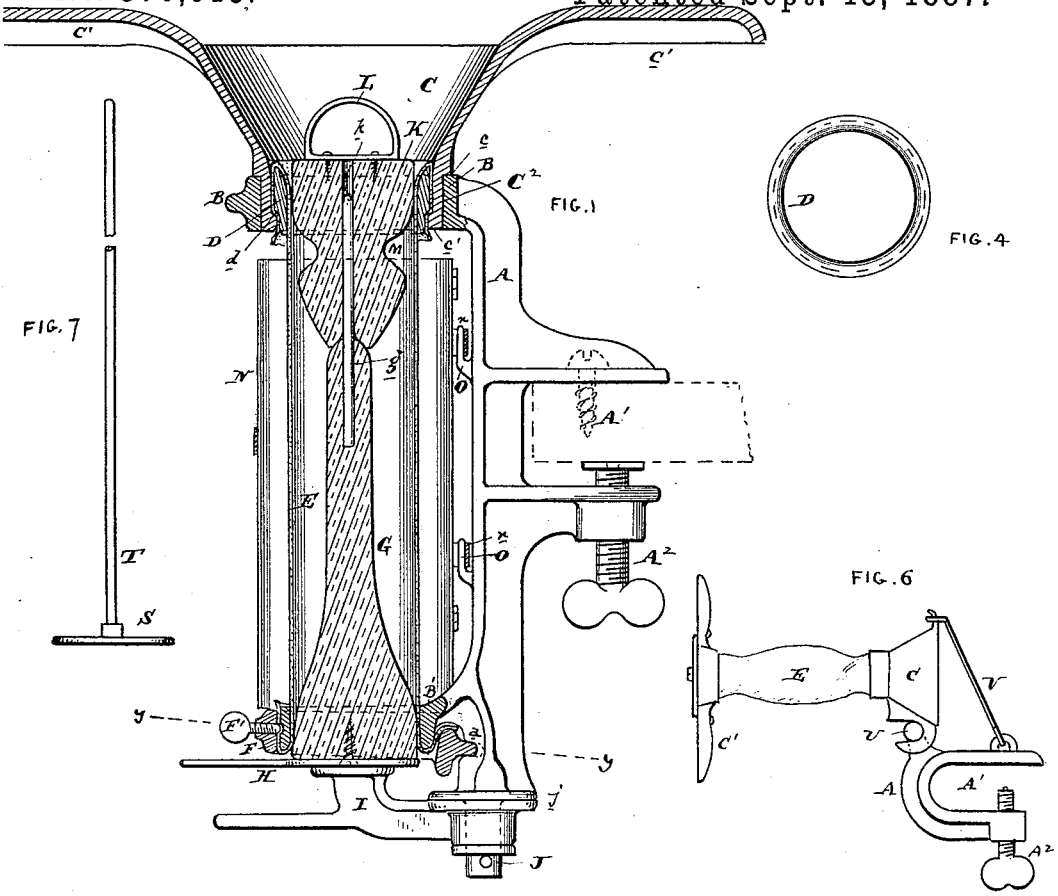
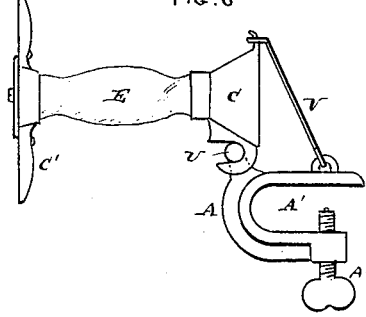
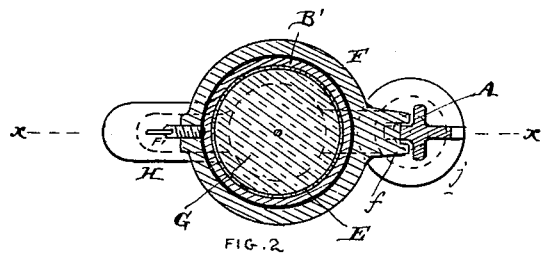
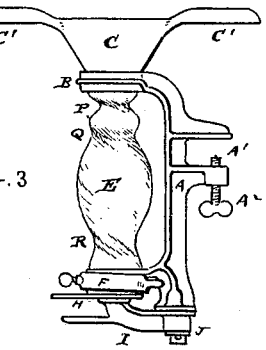
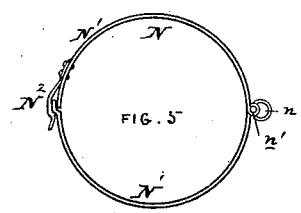
Attest
E. McDermott.
E. M. Breckinred
Inventor

UNITED STATES PATENT OFFICE.

RUDOLPH M. HUNTER, OF PHILADELPHIA, PENNSYLVANIA.

FRUIT-PRESS.

SPECIFICATION forming part of Letters Patent No. 370,015, dated September 13, 1887.

Application filed April 26, 1887. Serial No. 236,160. (No model.)

*To all whom it may concern:*

Be it known that I, RUDOLPH M. HUNTER, of the city and county of Philadelphia, and State of Pennsylvania, have invented an Improvement in Fruit-Presses, of which the following is a specification.

My invention has reference to fruit presses or strainers; and it consists in certain improvements, all of which are fully set forth in the following specifications and shown in the accompanying drawings, which form part thereof.

Heretofore fruit-presses have been made with a compressing-screw working in a horizontal tapering cylinder having a row of perforations on the bottom in a removable plate, the fruit being gradually forced through the cylinder and put under compression; and presses have also been made with a perforated cylinder and a piston working therein by means of a screw to compress the contents below the piston.

In carrying out my invention, I provide a strainer for the press, formed of textile material and supported in suitable frame-work, whereby the fruit-juices may be expressed through the textile material. In practice I prefer to form the strainer like a tube and wring the juices through it.

It is immaterial to my invention what the particular means employed may be, as there are a large number of ways of adapting a textile strainer to a commercial press in which the fruit is to be put under compression to express the juices.

The object of my invention is to produce a press which shall be suitable for all kinds of fruits and preserves and perform its function of separating the juices perfectly under all conditions. I also obtain an effective press at a low cost, as a practical demonstration of my improved press has proved.

In the drawings, Figure 1 is a sectional elevation of my improved press on line $xx$. Fig. 2 is a cross-section of same on line $yy$. Fig. 3 is a side elevation of same in act of expressing the juice. Fig. 4 is a plan view of one of the clamping-rings for the textile tube. Fig. 5 is a plan (end) view of the juice guard or case. Fig. 6 is a side elevation of a modified form of press, and Fig. 7 is an elevation of a form of scraper which may be used in cleaning the press.

A is the main frame, and is provided with a clamp-jaw, A′, having a clamping-screw, A², for attachment to a table, or may be simply screwed thereto, as indicated in dotted lines, Fig. 1. The top of this frame is provided with a ring-shaped bearing, B, in which the hopper C rests and is free to turn, and at the bottom with a similar clamping-ring, B′. The hopper C has handles C′ to turn it, and on its smallest or lower end it is made with a bearing, C², which fits the bearing B, and has a shoulder, $c$, to prevent its downward movement. The lower part of the interior of the hopper is provided with an annular shoulder, $d$, against which the clamping-ring D rests.

E is the textile straining-tube, the end of which is put up through the ring D, and then over it, and the ring and fabric are clamped in the part C² of the hopper, as shown. The harder the tube is pulled the more tightly does it bind. This hopper C, with its handles, to which the top of the tube is secured, may be considered a second or movable frame; hence it may be said that the tube is secured at its ends to two frames, one of which is stationary and the other movable.

The lower end of the tube E is passed through the ring B′ and brought up on the outside and clamped thereon by a clamping-ring, F, which has a lug, $f$, which fits into a notch, $a$, in the frame A, and is held at a point diametrically opposite by a thumb-screw, F′. By loosening the ring F the hopper and tube may be readily removed, if desired.

G is a stopper for the lower end of the tube E, and preferably extends up into the tube in the form of a cylinder, being provided on the top with a rod, $g$. The lower end of the stopper G is provided with a metal plate, H, having a handle by which the stopper may be inserted or removed.

I is a lock journaled on a vertical axis, J, with a wide bearing, $j$, which may be swung around under the stopper to hold it in place, as shown, or to allow it to be removed when cleaning the press. Any other form of lock may be used.

K is the top stopper, and is preferably made somewhat conical, with a central hole, $k$, by which it is placed upon pin $g$, and an annular groove, M, by which, when the tube E is twisted, the fabric twists into the groove and locks the stopper in place, as shown in Fig. 3. This stopper is provided with a handle, L, by which it may be manipulated. Any other convenient form of lock for stopper K may be used.

N is a casing or guard to prevent the expressed juice from flying out in all directions. It is shown as made of two parts, N', hinged together at $n'$, and locked at N², though this construction is not essential. The case N is provided with eyes $n$, by which it is hung to the frame A upon pins O, and thereby held in place. The juice runs down and into a basin placed under the press.

The operation is as follows: The stopper K being removed, the fruit is placed in the hopper C and runs down into the tube E. When properly filled, the stopper K is inserted. The handles C' are then grasped and the hopper turned. This twists up the tube E, producing a most powerful wringing effect, expelling all the juices, and at the same time preventing the interstices of the fabric from opening too wide for good work. As soon as the twisting begins, the fabric locks the stopper K in place, and these stoppers and central cylinder prevent the tube E being twisted up tight, which would result in liability of rupture to the tube E, owing to the enormous power exerted. After the juice is expressed the hopper is turned back and tube untwisted. The stopper K is then removed, the lock I is thrown around, and the stopper G withdrawn, discharging the contents.

If desired, a scraper, S, having a long rod, T, may be used for more thorough cleaning, though this is not necessary as a rule.

In the modification shown in Fig. 6 we have the hopper C hinged at U to the clamp-frame A and the handles C' placed upon the other end of the tube E. When filling the tube E, the hopper hangs vertically, but when expressing the juice the hopper is turned up and locked by link V, as shown, and then the handle C' turned. It is immaterial what the position of the tube E may be, though I prefer the construction shown in Fig. 1. The construction shown in Fig. 6 has, however, proved very successful in practice.

The tubes E are made of tightly-knitted linen yarn, though they may be of cotton or formed of flannel by sewing up a seam to make a tube.

The press, with the exception of the textile tube and stopper, is made of iron, and galvanized, so that it may be washed and will not rust. The stoppers are preferably made of hard wood, though they may be made of metal, if desired.

Having now described my invention, what I claim as new, and desire to secure by Letters Patent, is—

1. In a fruit-press, a tubular receptacle through which the fruit is strained, formed of textile material and having an opening through the end thereof, in combination with a suitable support for the same and a handle secured to the textile receptacle by which it may be twisted.

2. In a fruit-press, a tubular receptacle through which the fruit is strained, formed of textile material and having an opening through the end thereof, in combination with a suitable support for the same provided with a clamp and a handle secured to the textile receptacle by which it may be twisted.

3. In a fruit-press, the combination of a tubular straining-receptacle formed of textile material having open ends, frames to support the ends thereof, and stoppers to close the said ends and fitting within said frames.

4. In a fruit-press, the combination of a tubular straining-receptacle formed of textile material, frames to support the ends thereof, a handle to rotate one of said frames, stoppers to close the said ends and fitting within said frames, and locking devices to secure said stoppers in place.

5. In a fruit-press, a main frame, in combination with a tubular straining-receptacle secured at one end to said frame, a handle supported by said frame and secured to the other end of the tubular receptacle, and stoppers for the ends of the receptacle.

6. In a fruit-press, a main frame, in combination with a tubular straining-receptacle secured at one end to said frame, a hopper having a handle supported by said frame and secured to the other end of the tubular receptacle and opening therein, and stoppers for the ends of the receptacle.

7. In a fruit-press, a main frame, in combination with a tubular straining-receptacle secured at one end to said frame, a hopper having a handle supported by said frame and secured to the other end of the tubular receptacle and opening therein, and removable stoppers for the ends of the receptacle.

8. In a fruit-press, a main frame, in combination with a tubular straining-receptacle secured at one end to said frame, a hopper having a handle supported by said frame and secured to the other end of the tubular receptacle and opening therein, a cylindrical stopper for one end extending through the straining-receptacle, and a removable stopper for the other end of the receptacle.

9. In a fruit-press, a main frame, in combination with a tubular straining-receptacle secured at one end to said frame, a hopper having a handle supported by said frame and secured to the other end of the tubular receptacle, removable stoppers for the ends of the receptacle, and an inclosing-shield surrounding the straining-receptacle.

10. In a fruit-press, a tubular receptacle through which the fruit is strained, formed of textile material, in combination with a suitable support for same, a handle secured to the textile receptacle by which it may be twisted, and suitable stoppers for the ends of said receptacle, and a cylinder secured to one of the stoppers extending up through said receptacle.

11. In a fruit-press, the combination of a tube of textile material, a stationary frame having tubular ends, and a movable frame and suitable clamps for detachably connecting the tube to said frames and holding it upon the frames so as to form tubular openings upon its ends.

12. In a fruit-press, the combination of a tube of textile material secured to a stationary frame and closed at one end, a movable frame secured to the other end of the tube, and a removable stopper to close said end, having an annular groove into which the fabric of the tube twists to hold it in position.

13. The combination of a straining-receptacle with a frame secured to its mouth, by which it may be twisted, and a stopper for said mouth having an annular groove, into which the fabric of the receptacle is twisted to hold said stopper in place.

14. The combination of frame A, having bearing at the top and clamp-ring at the bottom, a tube, E, of textile material, a clamp to secure said tube to the clamp-ring, a rotary hopper, C, having handles and journaled in the bearing at the top, a clamp for securing the tube E to the hopper, a stopper, G, for the lower end of the tube E, and a lock to hold said stopper in place.

15. The combination of frame A, having bearing at the top and clamp-ring at the bottom, a tube, E, of textile material, a clamp to secure said tube to the clamp-ring, a rotary hopper, C, having handles and journaled in the bearing at the top, a clamp for securing the tube E to the hopper, a stopper, G, for the lower end of the tube E, a lock to hold said stopper in place, a removable stopper for the top of the tube, and means, substantially as set out, to hold said stopper in place when the tube is twisted.

16. The combination of frame A, having bearing at the top and clamp-ring at the bottom, a tube, E, of textile material, a clamp to secure said tube to the clamp-ring, a rotary hopper, C, having handles and journaled in the bearing at the top, a clamp for securing the tube E to the hopper, a stopper, G, for the lower end of the tube E, and a horizontally-swinging lock, I, to hold said stopper in place.

17. The combination of frame A, having bearing at the top and clamp-ring at the bottom, a tube, E, of textile material, a clamp to secure said tube to the clamp-ring, a rotary hopper, C, having handles and journaled in the bearing at the top, a clamp for securing the tube E to the hopper, a stopper, G, for the lower end of the tube E, extending upward in the form of a cylinder and terminating in a pin, $g$, a lock to hold said stopper in place, and a removable stopper, K, having a central hole for the pin $g$ and an annular groove, M, into which the tube twists and locks the stopper in position.

18. The combination, in a fruit-press, of a strainer formed of a tube of textile material with a frame having supports for the ends of said tube and a clamp thereon adapted to hold said tube vertically with respect to the table or board to which it is clamped.

In testimony of which invention I hereunto set my hand.

RUDOLPH M. HUNTER.

Witnesses:
BUTLER KENNER HARDING,
E. M. BRECKINREED.